United States Patent
Ara et al.

(10) Patent No.: US 8,246,853 B2
(45) Date of Patent: Aug. 21, 2012

(54) LIQUID ALKALI METAL WITH DISPERSED NANOPARTICLES AND METHOD OF MANUFACTURING THE SAME

(75) Inventors: Kuniaki Ara, Ibaraki (JP); Junichi Saito, Ibaraki (JP); Hiroyuki Sato, Tokyo (JP); Nobuki Oka, Tokyo (JP); Masahiko Nagai, Tokyo (JP); Koichi Fukunaga, Tokyo (JP)

(73) Assignees: Japan Atomic Energy Agency, Ibaraki (JP); Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/019,447

(22) Filed: Feb. 2, 2011

(65) Prior Publication Data

US 2011/0210285 A1    Sep. 1, 2011

(30) Foreign Application Priority Data

Mar. 1, 2010   (JP) .................................. 2010-044382

(51) Int. Cl.
*C09K 5/00*    (2006.01)
(52) U.S. Cl. ................ 252/71; 252/73; 252/74; 252/75; 252/77
(58) Field of Classification Search ........................ None
See application file for complete search history.

(56) References Cited

U.S. PATENT DOCUMENTS 7,968,383 B2 *   6/2011   Honda et al. .................. 438/149

FOREIGN PATENT DOCUMENTS

| JP | 2006-3176 | * | 1/2006 |
| JP | 3930495 | | 1/2006 |
| JP | 2006003176 | * | 1/2006 |

* cited by examiner

*Primary Examiner* — Necholus Ogden, Jr.
(74) *Attorney, Agent, or Firm* — Wenderoth, Lind & Ponack, L.L.P.

(57) ABSTRACT

The present invention relates to maintaining the fundamental physical properties of a liquid alkali metal with dispersed nanoparticles which is such that nanoparticles are uniformly dispersed and mixed in a liquid alkali metal used in heat exchange, cooling and other applications, and suppressing the reaction of the liquid alkali metal with dispersed nanoparticles. Provided is a method of manufacturing a liquid alkali metal with dispersed nanoparticles by dispersing nanoparticles in a liquid alkali metal. In this method, the nanoparticles are made of a metal having a large atomic bonding due to a combination with the liquid alkali metal compared to the atomic bonding of atoms of the liquid alkali metal and a metal having a large amount of charge transfer is used in the nanoparticles. The liquid alkali metal is selected from sodium, lithium and sodium-potassium alloys, and the nanoparticles to be dispersed are made of transition metals, such as titanium, vanadium, chromium, iron, cobalt, nickel and copper.

2 Claims, 6 Drawing Sheets

LIQUID ALKALI METAL WITH DISPERSED NANOPARTICLES AND METHOD OF MANUFACTURING THE SAME

BACKGROUND OF THE INVENTION

1. Field of the Invention

The present invention relates to maintaining the fundamental physical properties of a liquid alkali metal with dispersed nanoparticles which is such that nanoparticles are uniformly dispersed and mixed in a liquid alkali metal used in heat exchange, cooling and other applications, and suppressing the reaction of the liquid alkali metal with dispersed nanoparticles.

2. Description of the Related Art

Because in general, liquid alkali metals have low melting points, small heat capacities and good heat conductivity, studies are being made in order to use these metals in heat exchangers and as coolants for nuclear energy.

For example, because sodium has high thermal conductivity and for other reasons, this metal is named as a major candidate for the coolant used in a fast-breeder reactor (FBR) system. On the other hand, however, liquid alkali metals including sodium have high chemical reactivity as well as such properties that they can cause severe chemical reactions leading to explosions when they come into contact with air and water.

Therefore, there has been made a proposition to disperse ultra fine particles (nanoparticles: particles whose particle diameters are on the order of nanometers) in a liquid alkali metal, for example, sodium, whereby the high chemical reactivity of sodium is suppressed. For example, Japanese Patent No. 3930495 discloses a liquid alkali metal obtained by dispersing nano-size nickel ultra fine particles in liquid sodium.

However, in this disclosed art, attention is paid only to suppressing the high chemical reactivity of liquid alkali metals, and no discussion is made as to how to maintain various properties expressed by fluidity, viscosity, conductivity, specific heat and the like, which liquid alkali metals essentially have, thereby posing many problems in terms of practical use.

In the following descriptions, liquid metals such as liquid sodium are expressed, for example, as sodium and the like without discrimination between liquid and solid.

As described in the problem of the background art above, the challenge that the present invention takes up is to realize a liquid alkali metal containing uniformly dispersed and mixed nanoparticles, which maintains various properties expressed by fluidity, viscosity, conductivity, specific heat and the like, which liquid alkali metals essentially have, and in which a high chemical reactivity is suppressed.

SUMMARY OF THE INVENTION

For solving the problem described above, the first aspect of the present invention provides a method of manufacturing a liquid alkali metal with dispersed nanoparticles by dispersing nanoparticles in a liquid alkali metal. In this method, the nanoparticles are made of a metal which has a large atomic bonding due to a combination with the liquid alkali metal compared to the atomic bonding between the liquid alkali metal atoms and has a large amount of charge transfer.

In the second aspect of the present invention, the liquid alkali metal according to the first aspect is any one of metals selected from sodium, lithium and sodium-potassium alloys.

In the third aspect of the present invention, the nanoparticles according to the first or second aspect are made of any one of transition metals, such as titanium, vanadium, chromium, iron, cobalt, nickel and copper.

In the fourth aspect of the present invention, the liquid alkali metal with dispersed nanoparticles is manufactured by the method of manufacturing a liquid alkali metal with dispersed nanoparticles according to any one of first to third aspects.

The following advantageous effects can be realized by the present invention.

1) For a prescribed liquid alkali Metal, it is possible to specify a nanoparticle metal which has a good dispersion state, i.e., a nanoparticle metal which is uniformly dispersed and is capable of maintaining the dispersion state over time.

2) By using a liquid alkali metal with dispersed nanoparticles in which the nanoparticles of 1) above are used, it is possible to suppress the reactivity to water and the like.

3) By appropriately selecting the concentration of nanoparticles dispersed in a liquid alkali metal, it is possible to realize a liquid alkali metal with dispersed nanoparticles having physical properties equivalent to the physical properties which a pure liquid alkali metal has, and a method of manufacturing this liquid alkali metal with dispersed nanoparticles.

4) Furthermore, by appropriately selecting the kind, amount of dispersion and the like of a nanoparticle metal to be dispersed, according to applications such as heat exchange and cooling, necessary physical properties are changed among the physical properties of a liquid alkali metal with dispersed nanoparticles, such as surface tension and evaporation rate, whereby it is possible to realize a liquid alkali metal with dispersed nanoparticles suited to applications.

DETAILED DESCRIPTION OF THE PREFERRED EMBODIMENTS

Figure 1:
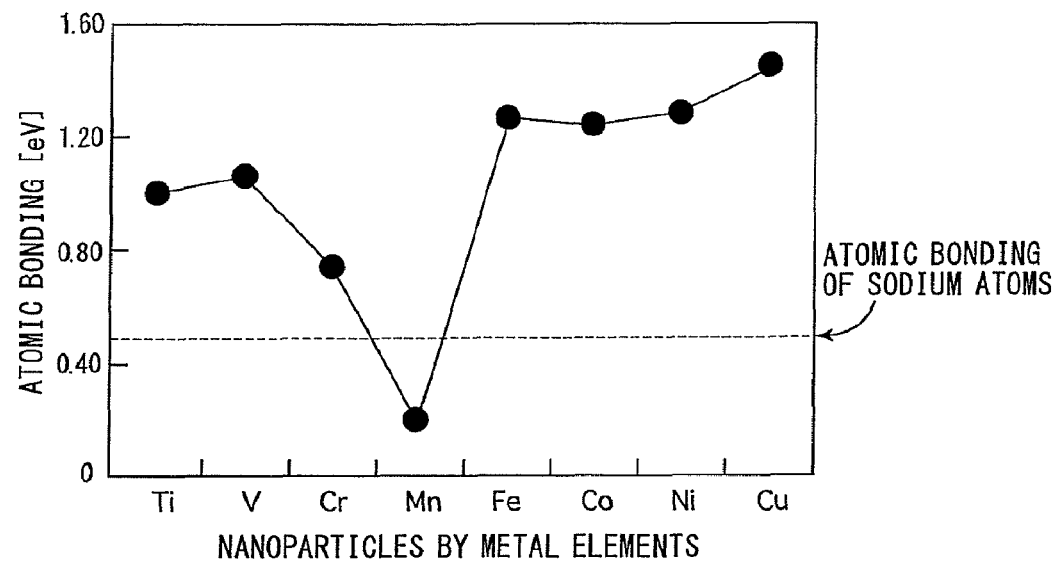
FIG. 1 is a diagram showing the atomic bonding between sodium and nanoparticles by metal elements.

The present invention provides a method of manufacturing a liquid alkali metal with dispersed nanoparticles by dispersing nanoparticles in a liquid alkali metal. In this method, the nanoparticles are made of a metal which has a large atomic bonding due to a combination with the liquid alkali metal compared to the atomic bonding between the liquid alkali metal atoms and a metal having a large amount of charge transfer is used in the nanoparticles. The liquid alkali metal is selected from sodium, lithium and sodium-potassium alloys, and the nanoparticles to be dispersed are made of transition metals, such as titanium, vanadium, chromium, iron, cobalt, nickel and copper.

The present invention realizes maintaining fundamental physical properties of a nanoparticles-dispersed liquid alkali metal which is obtained such that nanoparticles are uniformly dispersed and mixed in a liquid alkali metal used in heat exchange, cooling and other applications, and suppressing the reaction of the liquid alkali metal with dispersed nanoparticles.

In order to ensure that the liquid alkali metal with dispersed nanoparticles of the present invention is in an appropriate state, the two major factors "uniformly dispersing nanoparticles in a liquid alkali metal" and "maintaining the dispersion state" are responsible.

For "uniformly dispersing nanoparticles in a liquid alkali metal", the relationship between the atomic bonding of a liquid alkali metal and the atomic bonding of nanoparticles plays an important role, and for "maintaining the dispersion state", the amount of charge transfer indicating the bias of charge of nanoparticles plays an important role.

These two factors and various properties of a liquid alkali metal with dispersed nanoparticles will be described as embodiments with respect to the following items.
1. Atomic Interaction
  1.1 Theoretical calculations
   (1) Atomic bonding
   (2) Amount of charge transfer
  1.2 Experiment verification
   (1) Surface tension
   (2) Evaporation rate
2. Reaction Suppressing Effect
   (1) Reaction heat
   (2) Reaction rate
   (3) Oxidation reaction
   (4) Dispersion amount of nanoparticles and reaction suppressing effect
3. Relationship Between Reaction Suppressing Effect and Maintaining Heat Transfer and Fluidity
   (1) Melting point
   (2) Viscosity
   (3) Specific heat

[Embodiments]
1. Atomic Interaction

First, a description will be given of a process of finding metal elements which are considered to be effective in suppressing the chemical reactivity of a liquid alkali metal by being dispersed in the liquid alkali metal, by making theoretical calculations of the two items of atomic bonding and amount Of charge transfer.

1.1 Theoretical Calculations

Theoretical calculations will be described by taking sodium as an example of a representative of liquid alkali metals.

Not only sodium, but also lithium and sodium-potassium alloys can be used as liquid alkali metals capable of being used in the liquid alkali metal with dispersed nanoparticles according to the present invention.

In the theoretical calculations, a density functional (B3LYP functional) was used and the LanL2D basis (Los Alamos BCP+DZ base) was used as a basis function. In this specification, a description will be given of the results of atomic bonding and charge condition obtained by using a diatomic model.

(1) Atomic Bonding

FIG. 1 is a diagram showing the atomic bonding of sodium atoms and the atomic bonding between sodium and nanoparticles by metal elements of nanoparticles, which were found by theoretical calculations.

The atomic bonding of sodium atoms is 0.5 eV, and the 0.5 eV level of atomic bonding is indicated by a broken line in the FIG. 1. The atomic bonding between sodium atoms and the transition metals except chromium and manganese is as large as more than twice the atomic bonding between sodium atoms. As described above, it became apparent that the atomic bonding of nanoparticle metals and the sodium metal is considerably larger than the atomic bonding between sodium atoms. This shows that nanoparticles are strongly bonded with surrounding sodium atoms. And it is presumed that nanoparticles and sodium atoms form a cluster. The strength of atomic bonding shows a similar tendency even when the number of atoms of sodium particles and the number of surrounding sodium atoms increase.

From the results shown in FIG. 1, it is apparent that titanium, vanadium, chromium, manganese, iron, cobalt, nickel and copper are appropriate as nanoparticles, because they are metals having a great difference in the electronegativity from sodium, which is necessary to obtain a large atomic interaction, and furthermore, because they are 3d-transition metals having a small density in consideration of the dispersion into sodium.

(2) Amount of Charge Transfer

Next, a description will be given of metal elements capable of being advantageously used in the liquid alkali metal with dispersed nanoparticles according to the present invention from the viewpoint of the ease with which the transfer of charges occurs from sodium to each metal nanoparticle of transition metals, such as titanium, vanadium, chromium, manganese, iron, cobalt, nickel and copper.

Liquid alkali metals have the property of easily giving charges (electrons) in the interactions with other elements. For this reason, liquid alkali metals obtain a strong bonding by interacting with elements having a high electronegativity (a property of taking the large amount of charge (electrons) from other elements) and have the property that the both interactions become strong, for example, the charge transfer occurs. By using these properties well, it is possible to control the properties (physical properties) of liquid alkali metals.

Figure 2:
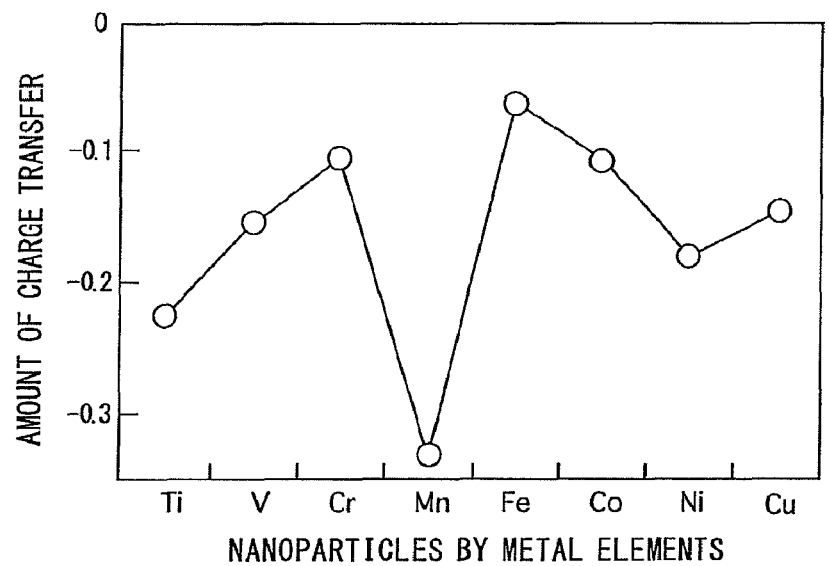
FIG. 2 is a diagram showing the amount of charge transfer of nanoparticles by metal elements.

FIG. 2 is a diagram showing the amount of charge transfer of nanoparticles by metal elements. The negative values of the ordinate of FIG. 2 indicate that the electrons are transferring from the sodium atoms to the nanoparticles. For example, these values indicate that electrons in number on the order of 0.23 are migrating from sodium to titanium. They indicate that titanium nanoparticles are attracting electrons from the surrounding sodium atoms. This charge state is caused by a difference in the electronegativity of atoms.

Due to this charge transfer, the bias of charge occurs in the interior and exterior of a cluster composed of nanoparticles and the surrounding sodium atoms. Because the exterior of the above-described cluster is positively charged, a repulsive force is generated among the clusters in sodium, and the dispersibility is improved. Thus, this suggests that the charge state of nanoparticles and sodium contributes to maintaining the dispersion of nanoparticles.

From the results of the study based on FIGS. 1 and 2, it is apparent that metal nanoparticles capable of being advantageously used in the liquid alkali metal with dispersed nanoparticles in accordance with the present invention have a strong atomic bonding than that of liquid alkali metals, and that with nanoparticles having a large amount of charge transfer, it is possible to realize a liquid alkali metal with dispersed nanoparticles which has a good dispersibility and is capable of maintaining the dispersion state over time. For example, when the liquid alkali metal is sodium, metal nanoparticles made of any one of the metals of titanium, vanadium, chromium, iron, cobalt, nickel and copper or metal nanoparticles composed of any combination of these metal nanoparticles are preferable.

1.2 Experiment Verification

In the experiment verification of the above-described theoretical calculations, the description will be given of actual examples in which the samples are such that the liquid alkali metal is sodium, the nanoparticles are titanium nanoparticles, the particle diameter is 10 nm to 20 nm, and the titanium nanoparticles are dispersed in the sodium of the liquid alkali metal at a rate of 2 at. %.

(1) Surface Tension

First, the surface tension of sodium and sodium with dispersed nanoparticles will be described. The titanium nanoparticles used in the present invention were produced by the evaporation method and thereafter dispersed in liquid sodium. The surfaces of the produced nanoparticles are non-oxidized surfaces.

Figure 3:
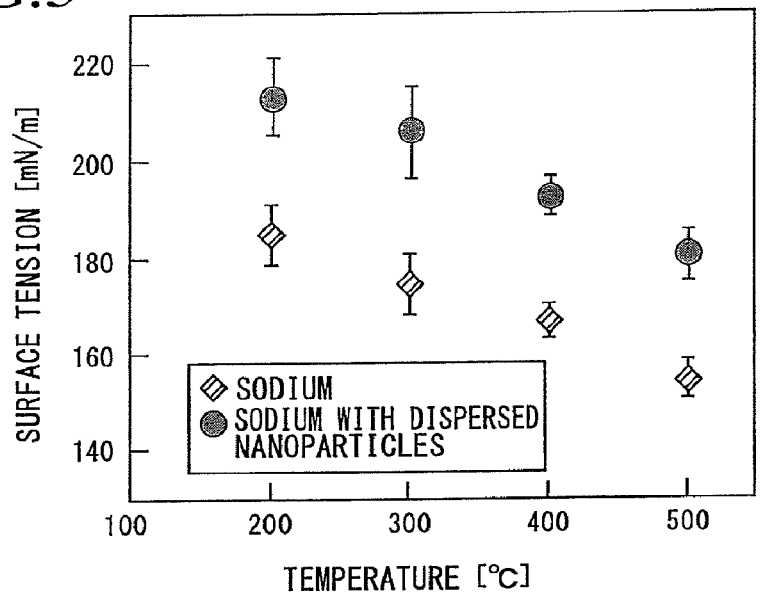
FIG. 3 is a diagram showing the temperature dependence of the surface tension of sodium and sodium with dispersed titanium nanoparticles, which is an embodiment of the present invention.

FIG. 3 is a diagram showing the temperature dependence of the surface tension of sodium and sodium with dispersed titanium nanoparticles. The measurement of surface tension was carried out by the pendant drop method through the use of a surface tensiometer (made by ANBE SMT Co., type ST-M-500-G-C). The measurement temperature range was 200° C. to 500° C., and the measurement atmosphere had oxygen concentrations of not more than 1 ppm and moisture concentrations of not more than 1 ppm.

According to FIG. 3, it is apparent that at all temperatures the surface tension of sodium with dispersed titanium nanoparticles is larger than the surface tension of sodium. This backs up the results of the theoretical calculations.

That is, the surface tension of sodium with dispersed nanoparticles does not change before and after a phase transfer, and this shows that the atomic interaction is stably maintained before and after a phase transfer.

(2) Evaporation Rate

Next, the evaporation rates of sodium and sodium with nanoparticles will be described.

Figure 4:
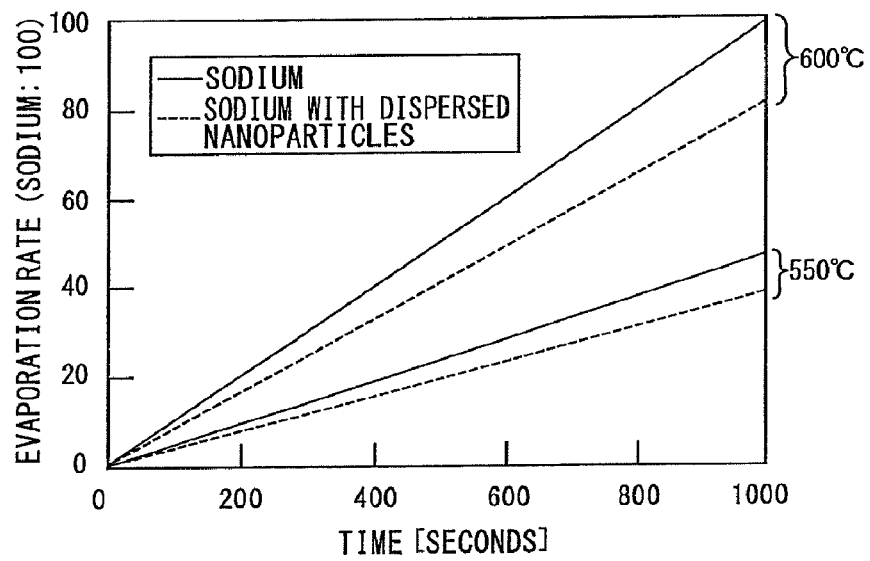
FIG. 4 is a diagram showing the evaporation rates of sodium and sodium with dispersed titanium nanoparticles, which is an embodiment of the present invention.

FIG. 4 is a diagram showing the evaporation rates of sodium and sodium with dispersed titanium nanoparticles. The measurement of evaporation rate was carried out by measuring weight changes in an oxidation reaction.

The measurement of weight changes in an oxidation reaction was carried out through the use of a dedicated measurement device fabricated beforehand. The measurement device is composed of a heater which heats the samples of sodium and sodium with dispersed nanoparticles at a constant temperature, a pool on which the samples are placed, and a balance (made by SHINKO DENSHI CO., LTD., type AF-R220) which measures the weight of the samples on this pool. Samples on the pool were heated by the heater at 550° C. or 600° C., weight changes of the samples were measured by use of the balance, and the evaporation rates of the samples were found by computing the weight changes.

FIG. 4 shows the measurement results. The measurement was carried out in an argon gas atmosphere in such a manner that the oxygen concentration became not more than 1 ppm and the moisture concentration became not more than 1 ppm.

According to FIG. 4, it is apparent that at all temperatures the evaporation rate of sodium is larger than the evaporation rate of sodium with dispersed titanium nanoparticles. This shows that the interatomic bonding in sodium with dispersed titanium nanoparticles is larger than the atomic bonding of sodium atoms, and suggests that the chemical activity of sodium with dispersed titanium nanoparticles decreases more than the chemical activity of sodium.

2. Reaction Suppressing Effect

On the basis of diagrams, the reaction suppressing effect of liquid metals with dispersed nanoparticles will be described from the viewpoints of (1) reaction heat, (2) rate of reaction, (3) oxidation reaction, and (4) amount of dispersion of nanoparticles and reaction suppressing effect.

(1) Reaction Heat

The ratio of reaction heat of sodium and sodium with dispersed nanoparticles will be described.

Figure 5:
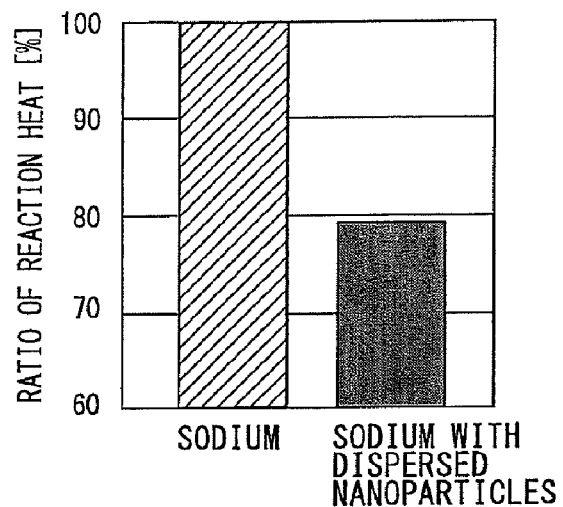
FIG. 5 is a diagram showing the reaction heat ratios of sodium and sodium with dispersed titanium nanoparticles, which is an embodiment of the present invention.

FIG. 5 is a diagram showing the ratio of reaction heat of sodium and sodium with dispersed titanium nanoparticles. The measurement of reaction heat was carried out by using a reaction heat measuring apparatus. The differential type was adopted as the measurement method. The reaction heat measuring apparatus used was Type SuperCRCe-20-250-2.4 made by OMNICAL, Inc.

Through the use of this apparatus, 2 ml of water was poured onto a 30-mg sample, and the reaction heat from the sample during the water pouring was measured. The measurement temperature was 30° C. and the measurement atmosphere had oxygen concentrations of not more than 1 ppm and humidity concentrations of not more than 1 ppm.

As is apparent from FIG. 5, the reaction heat of sodium with dispersed titanium nanoparticles is approximately 20% smaller than the reaction heat of sodium. Thus, it is apparent that the chemical reactivity of the sodium with dispersed titanium nanoparticles according to the present invention is more suppressed than the chemical reactivity of sodium.

(2) Reaction Rate

The reaction progress of sodium and sodium with dispersed nanoparticles will be described.

In this description of reaction rate, the reaction rate was verified by measuring pressure changes of hydrogen generated by a water reaction of sodium and sodium with dispersed titanium nanoparticles in a closed vessel.

Figure 6:
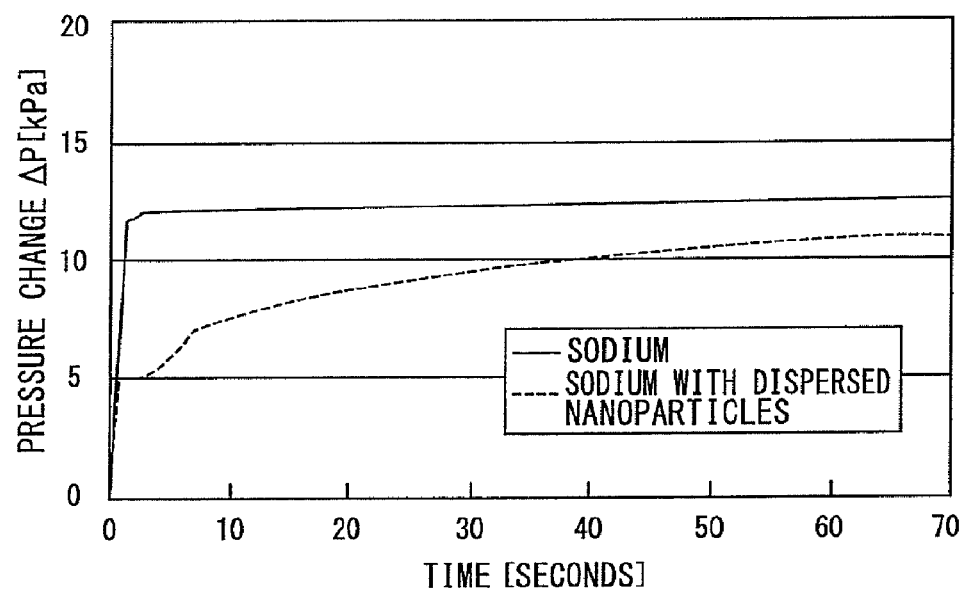
FIG. 6 is a diagram showing changes with time in the reaction progress of sodium and sodium with dispersed titanium nanoparticles, which is an embodiment of the present invention.

FIG. 6 is a diagram showing the time changes in the reaction progress of sodium and sodium with dispersed titanium nanoparticles. The apparatus used to obtain the data of FIG. 6 is roughly as follows. The apparatus has a vessel capable of holding an enclosed condition, and a holder on which samples are placed is provided within this vessel, and water is caused to fall in drops onto the samples placed on this holder. This apparatus is provided with a pressure gauge capable of measuring the pressure in the vessel. In the apparatus of the above-described construction, a 200-mg sample was set on the holder, 50 μg of water was caused to fall in drops and pressure changes in the vessel were obtained by use of the pressure gauge, whereby the results shown in FIG. 6 were obtained. The initial temperature in the vessel was set at 20° C.

In the case of sodium, the pressure change occurring after water is caused to fall in drops is steep, which shows that the reaction between sodium and water proceeds in a stroke. In contrast to this, in the case of sodium with dispersed titanium nanoparticles, the pressure rise occurring after water is caused to fall in drops is slow, and it is apparent that the chemical reactivity of the sodium with dispersed titanium nanoparticles according to the present invention is more suppressed than that of sodium.

(3) Oxidation Reaction Suppressing Effect

Oxidation reaction temperatures of sodium and sodium with dispersed nanoparticles will be described.

Figure 7:
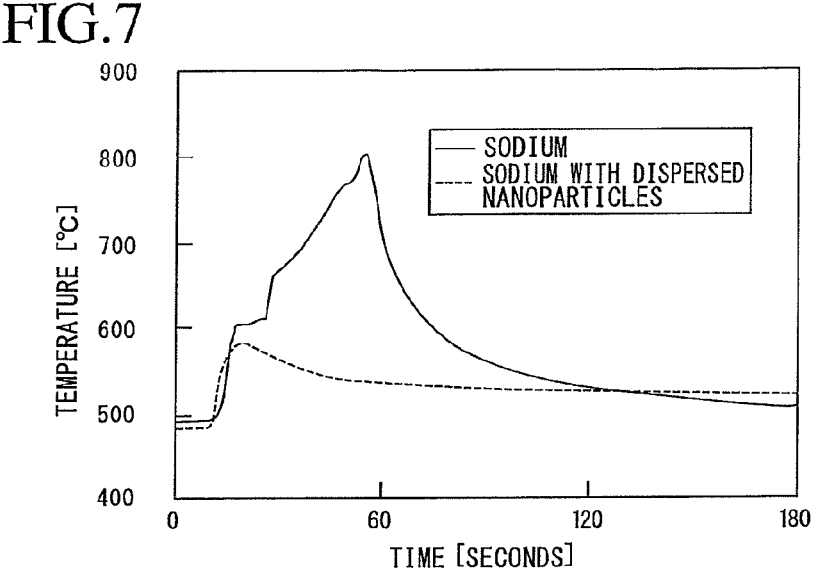
FIG. 7 is a diagram showing changes with time in the temperature, during oxidation reaction, of sodium and sodium with dispersed titanium nanoparticles, which is an embodiment of the present invention.

FIG. 7 is a diagram showing the time changes in the temperature of sodium and sodium with dispersed titanium nanoparticles during an oxidation reaction. The apparatus used to obtain the data of FIG. 7 is roughly composed of an arrangement for blowing a gas including oxygen onto a combustion pan on which a sample is placed and a thermocouple which measures the temperature of the combustion pan. Before the blowing of gas onto the sample, the temperature of the combustion pan was set at 500° C. The sample pool of the combustion pan had an area of 3 cm$^2$, and the set sample weighed 1.2 g. The gas blown onto the sample was a mixed gas containing 20% $O_2$ and 80% $N_2$, and the flow rate of the gas was 2 L/min.

According to FIG. 7, in the case of sodium, the oxidation reaction proceeds until the sample temperature exceeds 800° C., whereas in the case of sodium with dispersed titanium nanoparticles, the reaction temperature does not exceeds 600° C. Thus, also from the time changes of the oxidation reaction temperature, it is apparent that the chemical reactivity of the sodium with dispersed titanium nanoparticles according to the present invention is more suppressed than that of sodium.

(4) Amount of Dispersion of Nanoparticles and Reaction Suppressing Effect

Figure 8:
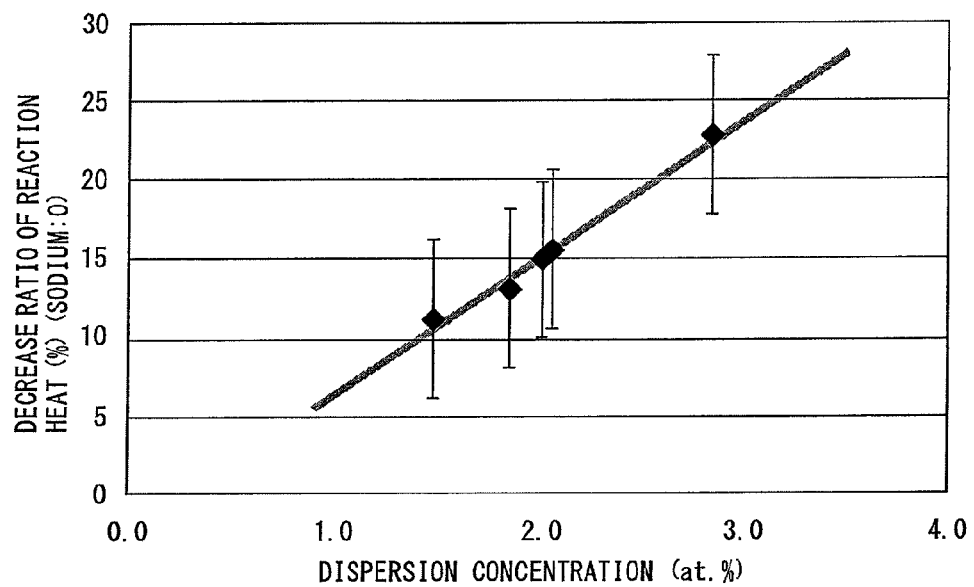
FIG. 8 is a diagram showing the decrease ratio of reaction heat of sodium with dispersed titanium nanoparticles, an embodiment of the present invention, which depends on the dispersion concentration of titanium nanoparticles.

Changes in physical properties which depend on the dispersion concentration of titanium nanoparticles will be described on the basis of reaction heat. FIG. 8 is a diagram showing the decrease ratio of reaction heat, which depends on the dispersion concentration of titanium nanoparticles. In FIG. 8, calculations were made on the basis of the decrease ratio of reaction heat of sodium which is regarded as 0, by changing the amount of dispersion of titanium nanoparticles to be dispersed in sodium.

The measurement of reaction heat was carried out by using a reaction heat measuring apparatus. The differential method was adopted as the measurement method. The reaction heat measuring apparatus used was Type SuperCRCe-20-250-2.4 made by OMNICAL, Inc.

Through the use of this apparatus, 2 ml of water was poured onto a 30-mg sample, and the reaction heat from the sample during the water pouring was measured. The measurement temperature was 30° C. and the measurement atmosphere had oxygen concentrations of not more than 1 ppm and moisture concentrations of not more than 1 ppm.

As is apparent from FIG. 8, the larger the amount of dispersion of titanium nanoparticles dispersed in sodium, the higher the decrease ratio of reaction heat and the lower the chemical reactivity, which is desirable.

Therefore, liquid alkali metals with dispersed nanoparticles which are such that metal nanoparticles of titanium or other metals are dispersed in a liquid alkali metal in dispersion concentrations of not more than 10 at. %, are appropriate as the liquid alkali metal with dispersed nanoparticles of the present invention. Furthermore, more preferably, if this dispersion concentration is not more than 5 at. %, it is possible to make physical properties as a coolant, such as melting point, viscosity and specific heat, comparable to each of the physical properties of sodium. Also, in the liquid alkali metal with dispersed nanoparticles of the present invention, it is preferred that the particle diameter of the metal nanoparticles dispersed in a liquid alkali metal be not more than 50 nm.

3. Relationship Between Reaction Suppressing Effect and Maintaining Heat Transfer and Fluidity (1) Melting Point Next, the melting points of sodium and sodium with dispersed nanoparticles will be described.

Figure 9:
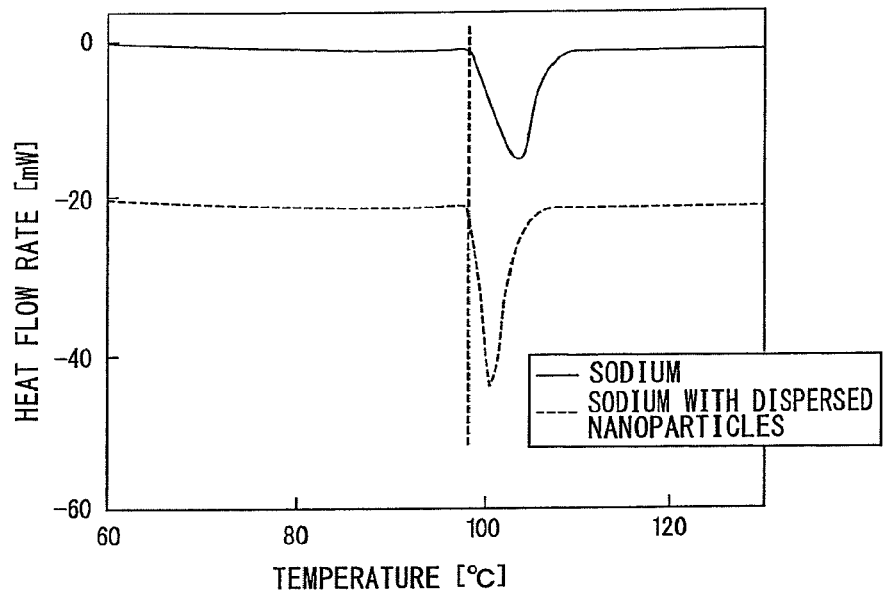
FIG. 9 is a diagram showing temperature changes in the heat flow rate, during melting point measurement, of sodium and sodium with dispersed titanium nanoparticles, which is an embodiment of the present invention.

FIG. 9 is a diagram showing temperature changes in the heat flow rate of sodium and sodium with dispersed titanium nanoparticles during melting point measurement. A differential scanning calorimeter (made by Bruker AXS K.K., type DSC3200SA) was used in the measurement of the melting points.

Through the use of this measuring apparatus, the melting points were measured on a 10-mg sample by raising the temperature from room temperature to 150° C. at a rate of 5° C./rain. The measurement atmosphere had oxygen concentrations of not more than 1 ppm and humidity concentrations of not more than 1 ppm.

As is apparent from FIG. 9, a remarkable difference cannot be observed between the melting point of sodium with dispersed titanium nanoparticles and the melting point of sodium. As described above, the sodium with dispersed titanium nanoparticles according to the present invention is more suppressed than sodium in the viewpoint of chemical reactivity, but for thermal properties such as melting point, there is no great change from sodium with incidental impurities and hence properties of sodium with dispersed nanoparticles comparable to those of sodium can be expected as properties of a coolant.

(2) Viscosity

Next, the viscosities of sodium and sodium with dispersed nanoparticles will be described.

Figure 10:
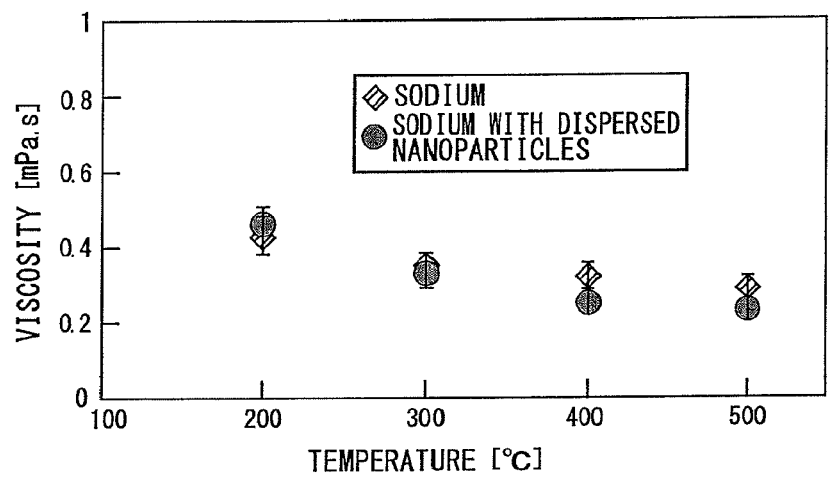
FIG. 10 is a diagram showing the temperature-dependent viscosity changes of sodium and sodium with dispersed titanium nanoparticles, which is an embodiment of the present invention.

FIG. 10 is a diagram showing viscosity changes of sodium and sodium with dispersed titanium nanoparticles, which are caused by temperature changes. A viscosimeter (made by MTL Instruments, type XL7-900VS10-HT3) was used in the measurement of the viscosities. The measurement temperature range was 200° C. to 500° C., and the measurement atmosphere had oxygen concentrations of not more than 1 ppm and moisture concentrations of not more than 1 ppm.

As is apparent from FIG. 10, at 200° C. and 300° C. a remarkable difference cannot be observed between the viscosity of sodium with dispersed titanium nanoparticles and the viscosity of sodium.

On the other hand, it can be ascertained that at 400° C. and 500° C. the viscosity of sodium with dispersed titanium nanoparticles somewhat exceeds the viscosity of sodium. However, because 400° C. and 500° C. are the regions in which the viscosity decreases and, therefore, this increase in viscosity does not greatly impair the flow properties of sodium with dispersed titanium nanoparticles as a coolant.

As described above, the sodium with dispersed titanium nanoparticles according to the present invention is more suppressed than sodium in the viewpoint of chemical reactivity, but for flow properties such as viscosity, there is no great difference from sodium with incidental impurities and hence it is expected that the sodium with dispersed titanium nanoparticles according to the present invention maintains coolant properties comparable to sodium.

(3) Specific Heat

Next, the specific heat of sodium and sodium with dispersed nanoparticles will be described.

Figure 11:
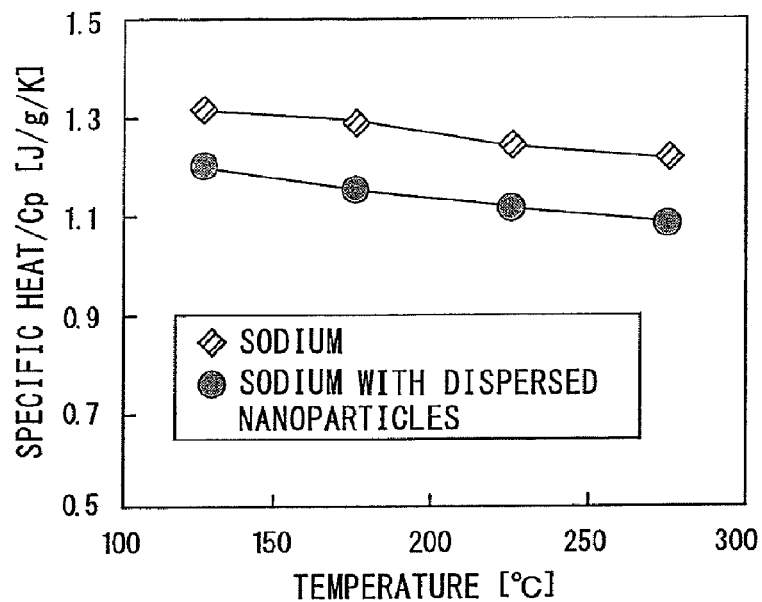
FIG. 11 is a diagram showing the temperature-dependent specific heat changes of sodium and sodium with dispersed titanium nanoparticles, which is an embodiment of the present invention.
Figure 12:
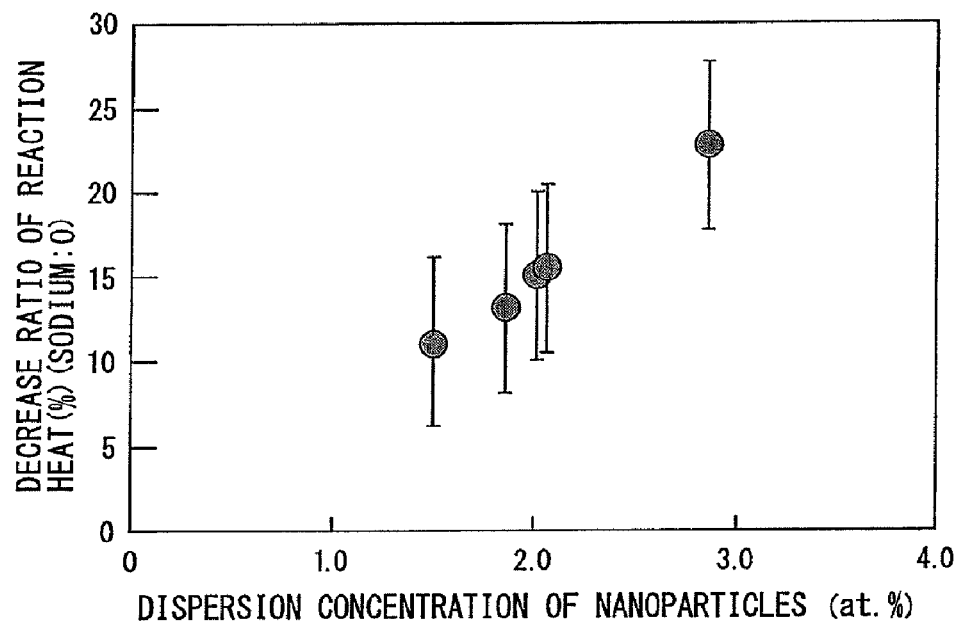
FIG. 12 is a diagram showing the decrease ratio of reaction heat which depends on the dispersion concentration of titanium nanoparticles.

FIG. 11 is a diagram showing the temperature-dependent specific heat changes of sodium and sodium with dispersed titanium nanoparticles. In the measurement of specific heat, the same differential scanning calorimeter as that used in the measurement of the melting points was used.

Through the use of this measuring apparatus, the specific heat was measured on a 10-mg sample by raising the temperature at a rate of 5° C./min. The measurement temperature range was 100° C. to 300° C. The measurement atmosphere had oxygen concentrations of not more than 1 ppm and moisture concentrations of not more than 1 ppm.

From FIG. 11, it can be ascertained that in the whole temperature range the specific heat of sodium with dispersed titanium nanoparticles is lower than the specific heat of sodium by about 0.15. When the sodium with dispersed titanium nanoparticles according to the present invention is viewed as a coolant, the properties of the sodium with dispersed titanium nanoparticles are somewhat inferior to those of sodium with incidental impurities from the standpoint of specific heat. However, the chemical reactivity of the sodium with dispersed titanium nanoparticles according to the present invention is more suppressed than that of sodium and it can be said that, with all things considered, the sodium with dispersed titanium nanoparticles according to the present invention is superior to sodium with incidental impurities.

The above description was given of the case where a liquid alkali metal is sodium and nanoparticles are made of titanium. However, in the case of a general alkali metal, for combinations of a liquid alkali metal and nanoparticles, by making nanoparticles from a metal which has a large atomic bonding due to a combination with a prescribed liquid alkali metal compared to the atomic bonding of atoms of the prescribed liquid alkali metal and has a large amount of charge transfer, it is possible to realize a liquid alkali metal with dispersed nanoparticle which has good dispersibility, can maintain dispersion over time and whose chemical activity is suppressed.

For the dispersion concentration of nanoparticles in a liquid alkali metal, by selecting the above-described fundamental physical properties suitable for the application of a liquid alkali metal with dispersed nanoparticles and selecting nanoparticle concentrations in the range which does not affect the selected fundamental physical properties, it is possible to realize a liquid alkali metal with dispersed nanoparticles suited to the application.

What is claimed is:

1. A method of manufacturing a liquid alkali metal with dispersed nanoparticles by dispersing nanoparticles in a liquid alkali metal,
   wherein the liquid alkali metal is lithium or a sodium-potassium alloy, and
   wherein the nanoparticles are made of vanadium or chromium.

2. A liquid alkali metal with dispersed nanoparticles,
   wherein the liquid alkali metal with dispersed nanoparticles is manufactured by the method of manufacturing a liquid alkali metal with dispersed nanoparticles according to claim 1.

* * * * *